United States Patent [19]

Liu

[11] 4,407,575
[45] Oct. 4, 1983

[54] STEREOSCOPIC PHOTOGRAPHY

[76] Inventor: Hon Liu, 200 Aberdeen Main Rd., 5th Floor, Rear Portion, Hong Kong, Hong Kong

[21] Appl. No.: 323,790

[22] Filed: Nov. 23, 1981

[30] Foreign Application Priority Data

Nov. 24, 1980 [GB] United Kingdom ............... 8037617

[51] Int. Cl.$^3$ ........................................... G03B 35/08
[52] U.S. Cl. ................................................. 354/115
[58] Field of Search ............ 354/112, 114, 115, 116; 350/133, 135

[56] References Cited

U.S. PATENT DOCUMENTS

| 2,573,543 | 10/1951 | Childs | 354/114 X |
| 2,601,817 | 7/1952 | Samoggia | 354/115 |
| 2,709,401 | 5/1955 | Jaros | 354/115 |
| 3,045,572 | 7/1962 | Kinnard | 354/115 |

FOREIGN PATENT DOCUMENTS

| 477794 | 2/1953 | Italy | 354/114 |
| 522163 | 6/1940 | United Kingdom . | |
| 713685 | 8/1954 | United Kingdom . | |

Primary Examiner—Donald A. Griffin
Attorney, Agent, or Firm—Townsend and Townsend

[57] ABSTRACT

A method of forming a stereoscopic pair of images on a length of photographic film is provided in which one image is exposed adjacent one longitudinal side of a length of photographic film over a width of approximately half the available width of the film while the other image is exposed adjacent the other longitudinal side of the film over the remaining available width of the film, the film extending lengthwise in the form of a loop between the places where a particular stereoscopic pair are exposed and the loop being formed by bending the film through 180° between the positions where the individual images of a stereoscopic pair are exposed.

An advantage of this is that during the exposure of the image pair the spacing between the optical systems used to provide the left and right-hand side images can be adjusted to suit the particular scene being photographed.

It may also be desirable for one image to be a full image and the other to be of the same scale but occupy less height or width across the film, the top portion of the image being omitted. Thus, there is usually little stereoscopic information in that portion and the observer can accommodate for this missing portion so that the actual images on the film can be larger.

The invention also extends to a camera and to a viewer for use in this method.

16 Claims, 7 Drawing Figures

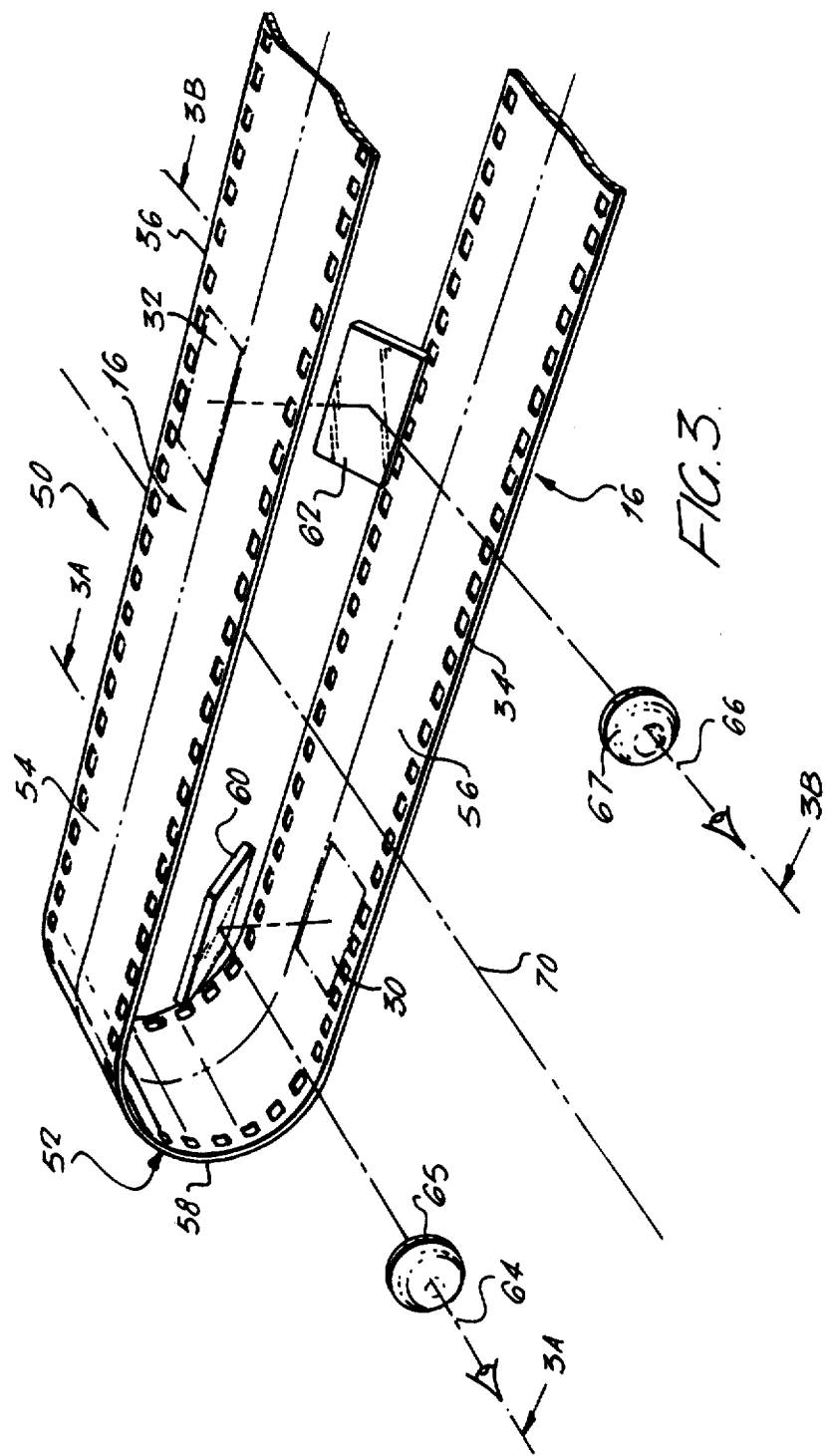

STEREOSCOPIC PHOTOGRAPHY

This invention relates to stereoscopic photography. In particular, the invention relates to a method of preparing stereoscopic pairs on a photo-sensitive substrate such as film, to a camera for use in that method, to a viewer by means of which the stereoscopic pair can be viewed, and to a length of photographic film having positioned along it a number of stereoscopic pairs formed by the method.

BACKGROUND TO THE INVENTION

There have been numerous attempts in the past to provide a satisfactory format for the arrangement of a stereoscopic pair of images onto photographic film but despite these numerous attempts no really satisfactory format exists which is of general application to all sizes of photographic film. Also, no format exists which enables the spacing between the axes at which the images are taken and thereafter viewed to be variable to suit the type of subject when the film is being exposed and to suit the precise spacing of the eyes of the user when the pair are being viewed.

It is therefore an object of my invention to provide an arrangement whereby this is possible.

SUMMARY OF THE INVENTION

According to the invention in one aspect there is provided a method of forming a stereoscopic pair of images on a length of photographic film in which one image is exposed adjacent one longitudinal side of a length of photographic film over a width of approximately half the available width of the film whilst the other image is exposed adjacent the other longitudinal side of the film over the remaining available width of the film, the film extending lengthwise in the form of a loop between the places where a particular stereoscopic pair are exposed and the loop being formed by bending the film through 180° between the positions where the individual images of a stereoscopic pair are exposed.

Most desirably, the images are recorded on the emulsion side of the film and so the planes of the film in the arms of the loop where the images are recorded are preferably at right angles to the plane of the original image, reflectors such as mirrors or prisms being used to turn the light image into the plane of the film, the reflectors being oriented to reflect the images in opposite directions, one towards the emulsion side of the film on one arm of the loop and the other again towards the emulsion side of the film but on the other arm of the loop.

When the resulting film is to be viewed in a viewer, it is again necessary for the film to be bent into a loop through 180° and then the two images of a stereoscopic pair are brought to a spacing suitable for the spacing between the human eyes and can be viewed at that spacing. Preferably, as for the camera, the planes of the film in the two arms of the loop are at right angles to the axis of viewing and reflectors such as mirrors or prisms are used to bend the axes of the images so that they appear in the same virtual plane at right angles to the plane of the film in the arms of the loop.

The invention also extends to a length of photographic film having spaced along it sets of stereoscopic pairs of images, one image of each pair being positioned adjacent one longitudinal edge of the film over a width of approximately half the available width of the film and the other image of the pair being positioned adjacent the other longitudinal edge of the film over the remaining available width of the film. Desirably, in such a length of film, the images of a pair are oriented so that one is upside down relative the other when both are observed from the emulsion side of the film, e.g. when the film is laid out flat. As viewed on a flat piece of film, the two images of a stereoscopic pair are the opposite way around widthwise of the images and lengthwise of the film.

Further, the invention extends to a camera capable of exposing the film in this manner and a viewer capable of viewing the resulting film.

An advantage of the invention is that by providing the loop where the film is turned through 180° between the positions where the stereoscopic pair of images are recorded along the film, the actual spacing of the optical systems for collecting the images and recording them on the film can be varied. This can be important when a range of different types of images are being photographed. Thus for distant views, the stereoscopic effect is largely lost if the recorded images are taken at the normal eye spacing and so for distant views, to increase the stereoscopic effect, it is highly desirable to space out the two axes from which the stereoscopic pair of views are observed. By contrast, the opposite is true for close-up scenes where, to prevent an entirely artificial perspective, it can be desirable to reduce the spacing from which the two views are obtained so that it is much less than the normal human eye spacing.

According to one preferred embodiment of the invention, a camera is provided having two optical systems, one for recording a left-hand image and one for recording a right-hand image, and the spacing between these optical systems is variable, e.g. from 5 to 8 cm, by moving them relative a central axis half-way between them by equal and opposite amounts, the camera further comprising means to hold the film in a loop, the two arms of which are parallel to one another, and means progressively to advance the film between exposures along one arm where one image is recorded, around the head of the loop where the film is bent through 180° to and along the other where the other image is recorded.

In such a camera, the film is moved around the loop relative the camera when an adjustment is made to the spacing of the left and right-hand images but the actual size of the loop and position of the bent portion need not vary. This enables the camera to be relatively simple.

Although most human beings have an actual eye spacing which is very close to the average eye spacing, around 6 to 7 cm, it can still be useful to be able to adjust the axes of the viewing lenses in a viewer so that they can be matched precisely to the individual user. Therefore, it is preferred that a viewer according to the invention include two viewing lens systems, one for viewing the left-hand image and the other for viewing the right-hand image, and the spacing between these lens systems is variable by moving them relative a central axis halfway between them by equal and opposite amounts, the film being held in the viewer in a loop, the two arms of which are parallel to one another. In such a viewer the film will move around the loop relative the viewer when an adjustment is made to the spacing of the viewing lens system but the position of the bent portion of the loop need not change relative the viewer.

When a film carries images of a stereoscopic format with a pair spaced across the width of the film, of necessity two images have to be reproduced on the film in place of the equivalent single image for non-stereoscopic recording. Therefore, the images have to be of a much smaller size and this leads to problems of quality of the image particularly when the film format is of a smaller size, e.g. 8 mm film. I have noticed, however, that much of the stereoscopic information in the average photographic image is contained in that part of the image representing the centre and foreground, i.e. the middle and bottom of an image. Therefore, according to another aspect of the invention, I propose to compensate to some extent for the small width size of the two images by providing one image of the stereoscopic pair which is larger than the other in the widthwise sense of the film, i.e. in the direction at right angles to the spacing between the axes of the left and right hand imaging systems, and eliminating from the other image of the particular pair the top part of the image, i.e. that which would normally correspond to the sky. Thus one image represents more than half the overall available width of the film while the other image represents less than half and in practice I find that the difference in sizes could be such that the larger image occupies approximately 60% of the available width of the film whilst the smaller image occupies approximately 40% of the film; however a range of from 55 to 65% for the wider image and a range of from 35 to 45% of the narrower image is possible. Of course because a series of images occupy the same overall length along the length of the film, it is not necessary or appropriate to reduce the width of either image in the lengthwise direction of the film.

When such stereoscopic pairs are viewed in a film viewer or viewed by projection, a good stereoscopic impression is still given since the larger image has all of the information of the photograph whilst the smaller image, which contains predominantly foreground and middleground information, provides the required stereoscopic information and this seems to be sufficient for the brain of the user to reconstitute a more or less complete overall image of good stereoscopic effect.

BRIEF DESCRIPTION OF THE DRAWINGS

The invention will now be illustrated, by way of example, with reference to the accompanying drawings, in which:

FIG. 3 is a diagram of a viewer according to the invention for viewing the stereoscopic pair of images;

DESCRIPTION OF THE PREFERRED EMBODIMENTS

Figure 1:
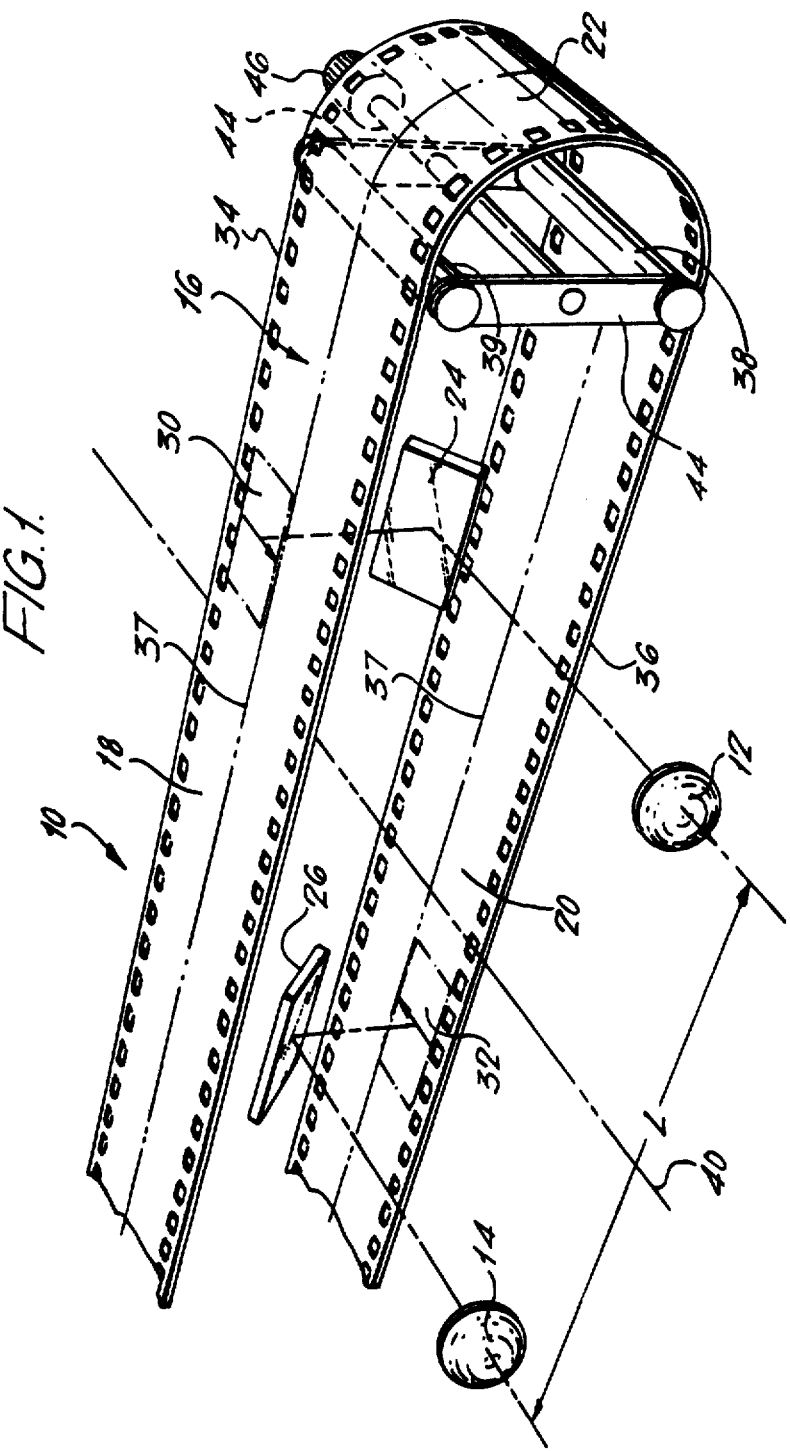
FIG. 1 is a diagram of a camera according to the invention for taking stereoscopic pairs of images.
Figure 2:
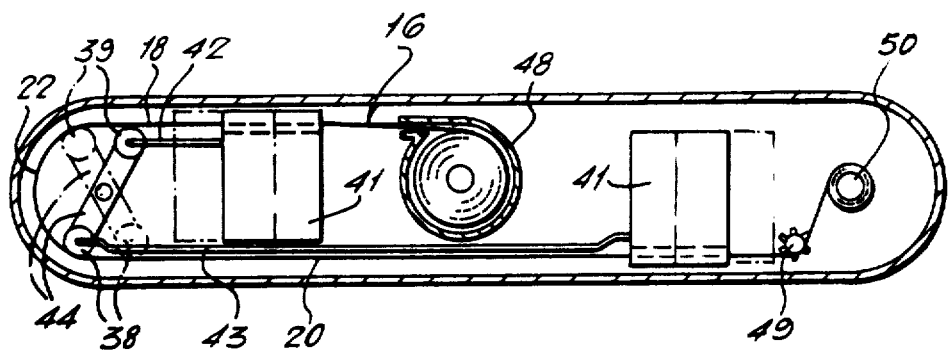
FIG. 2 is a diagram of the camera according to the invention taken from the rear.

Turning to FIGS. 1 and 2, these show in diagrammatic fashion the essential components of a stereoscopic camera 10 according to the invention. For simplicity, details of the shutters, the optical systems, the film advance mechanism, the casing and so on of the camera are not shown since they can be conventional.

The camera 10 has left and right-hand optical lens systems 12 and 14, respectively, for collecting the image of a scene from two spaced positions in the conventional manner with stereoscopic cameras. Since these lens systems view the scene from slightly different view points, when the resulting images are thereafter viewed in the appropriate viewer, the brain of the viewer reconstitutes the perspective just as if the individual were standing looking at the scene being photographed by the stereo camera 10.

A length of film 16 to be exposed extends in the form of a loop having two spaced parallel flat arms 18 and 20 and a bent portion 22 where the film is bent through an angle of 180°.

The left-hand lens system 12 includes a mirror 24 which is angled at 45° to the plane of the film in the arm 18 and so the mirror reflects the image from the left lens system upward onto the film along the upper arm 18 where a left-hand image 30 is recorded. The right-hand lens system 14 includes a mirror 26 which is angled at 45° to the plane of the film in the arms but at this time it is angled at 90° to the mirror 24. As a result the image from the right-hand lens system 14 is reflected downwardly onto the the film in the lower arm 20 and the right-hand image 32 is recorded there.

It will be seen that both the left and right-hand images 30 and 32 are recorded directly on the emulsion side of the film since the film is bent through 180° and so in each case the emulsion side of the film in the arms 20 and 18 can face the respective mirrors 24 and 26.

It will also be seen that the image 30 from the left-hand lens system 12 is recorded adjacent the rear longitudinal edge 34 of the film whilst the image 32 from the right-hand lens system 14 is recorded adjacent the front longitudinal edge 36 of the film. Therefore, in a series of images, whether completely separate still images or a series intended as a movie sequence, the left-hand images 30 do not conflict with the right-hand image 32 since the left-hand images are recorded on one side of an approximately halfway line 37 whilst the right-hand images are recorded on the other side of the line.

Within the camera, suitable guides are provided to hold the film 16 aligned as shown, the bent portion 22 being supported by a pair of idly mounted rollers 38 and 39.

As shown in FIG. 1, the spacing between the axes of the left and right-hand lens systems 12 and 14 is the distance L. In most stereoscopic cameras, this spacing is fixed. In the camera 10, however this spacing can be varied so that for distant subjects the spacing can be increased and for close subject the spacing can be decreased from a normal conventional spacing L corresponding to the average space between the eyes of an average person.

In the camera 10, each lens system is spaced by a distance L/2 from either side of a central axis 40 halfway between the two lens systems. The left and right-hand lens systems 12 and 14 are then movable relative that central axis 40 by equal and opposite amounts. Thus for example, to increase the spacing, the right-hand lens system 14 is moved outwardly to the left as viewed in FIG. 1 whilst the left-hand lens system 12 is moved outwardly to the right as viewed in FIG. 1.

Alternatively, to decrease the spacing both lens systems are moved inwardly relative the axis 40.

So that the alteration of the spacing of the lens systems does not cause an image to be exposed over an already exposed piece of film, the film must be moved together with the movement of the lens systems. This is achieved by providing a pair of hollow boxes 41, one for each lens system. These boxes support the respective mirrors 24 and 26 and are movable left and right in the sense seen in FIG. 2. The boxes are provided with slots through which the film 16 passes to hold it flat for exposure and each box has a cut-out rectangular region through which the image is directed onto the film by the respective mirrors 24 and 26. The boxes are joined by links 42 and 43 to opposite ends of a pair of cranks 44 which also rotatably support the rollers 38 and 39. The cranks 44 can be pivoted by a knob 46. When the knob 46 is turned, the cranks can be pivoted between the position shown in full lines and the position shown in broken lines in FIG. 2 and pivoting of the cranks causes the boxes 41, and their associated lens systems to slide by equal and opposite amounts. During this movement the film is entrained by the boxes 41 and passes around the bent portion 22. Thus, the film moves downwardly around the bent portion 22 in the sense as viewed in FIG. 1 when the spacing is increased and upwardly around the bent portion in the sense as viewed in FIG. 1 when the spacing is decreased. However, the actual position occupied by the bent portion 22 is not substantially changed. This greatly simplifies the construction of the camera.

The film 16 itself passes from a film spool 48, through the top of the box 41 associated with the left-hand lens system, around the rollers 39 and 38, through the bottom of the box 41 associated with the right-hand lens system to a wind-on drive spool 49 and to a take-up spool 50. When the film moves around the bent portion 22 as a result of adjusting the spacing of the lens systems, film is fed into or taken from the spools 48 and 49.

Figure 4:
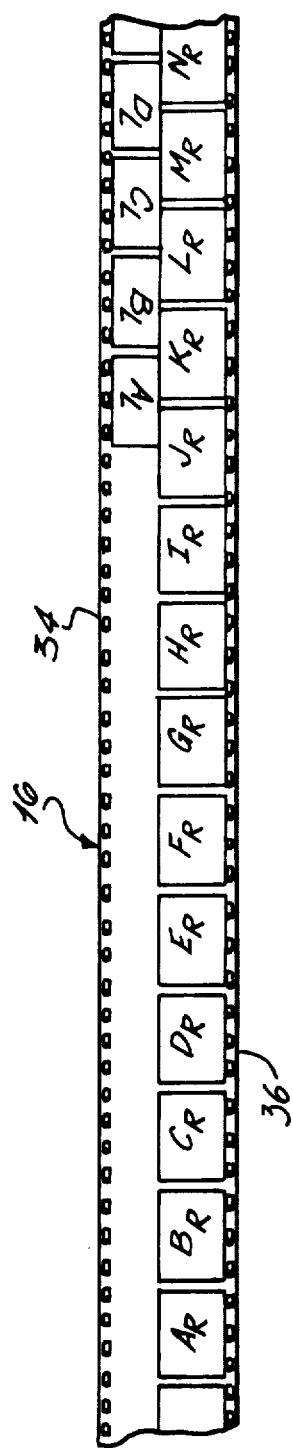
FIG. 4 shows a length of film strip carrying a number of stereoscopic images exposed according to the invention.

It will also be noted from FIG. 1 that the image 30 from the left-hand lens system is upside down relative the image 32 from the right-hand lens system. This is best shown in FIG. 4 where a series of left and right-hand images $A_L$ and $A_R$ respectively, $B_L$ and $B_R$ respectively, and so on are provided along the length of film 16. Thus the right-hand images follow one another adjacent the longitudinal edge 36 and the left-hand images follow one another adjacent the longitudinal edge 34 whilst a left and right-hand pair, such as $A_L$ and $A_R$ are spaced from one another along the length of the film by the distance along the lower arm 20, around the bent portion 22 and back along the upper arm 18. Further, the left and right-hand images of a pair are upside down relative one another.

Turning next to FIG. 3, this shows in diagrammatic form a viewer 50 according to the invention for viewing the exposed film 16. As with the camera 10, the viewing lens systems and the film advance system are not shown in detail since these can all be conventional.

The film 16 is held in the shape of a loop 52 comprising an upper arm 54 and a lower arm 56 joined by means of a bent portion 58 where the film is bent through 180°. In the space between the two arms 54 and 56 are provided mirrors 60 and 62 which are inclined at 45° to the plane of the film in the arms 54 and 56 except that the two mirrors are angled at 90° relative one another. Therefore, when the viewer is in use, the left eye of the user looks along the axis 64 through a lens 65 at the mirror 60 which gives to the eye an image of the left-hand image 30 which is positioned adjacent the longitudinal edge 34 on the lower arm 56, whilst the right eye looks along the axis 66 through a lens 67 and at the mirror 62 which provides an image of the right-hand image 32 adjacent the edge 36 on the film from the upper arm 54.

As with the camera, it is possible to adjust the spacing between axes 64 and 66 so as to suit precisely the actual spacing between the eyes of an individual user. To do this the axes are movable by equal and opposite amounts relative a central axis 70 positioned half-way between the axes. This movement can be achieved in a manner similar to that described in connection with the camera 10. Then when the spacing between the two axes 64 and 66 is adjusted, the actual position of the bent portion 58 does not change although the film moves progressively round that bent portion in the upward sense shown in FIG. 3 when the spacing between the axes is increased and in the downward sense shown in FIG. 3 when the spacing between those axes is decreased.

Figure 3A:
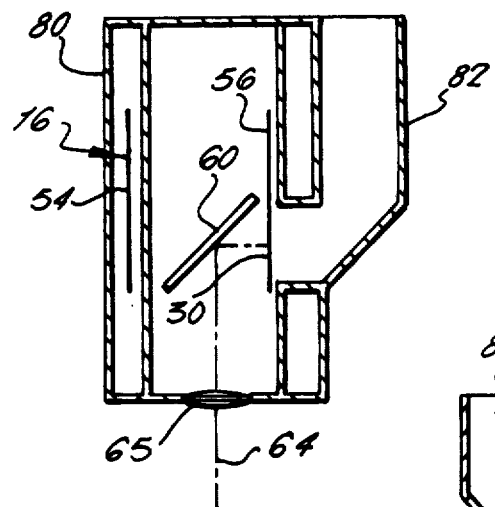
FIGS. 3A and 3B are sections taken on lines 3A—3A and 3B—3B of FIG. 3 through a viewer having the features shown in the diagram of FIG. 3.
Figure 3B:
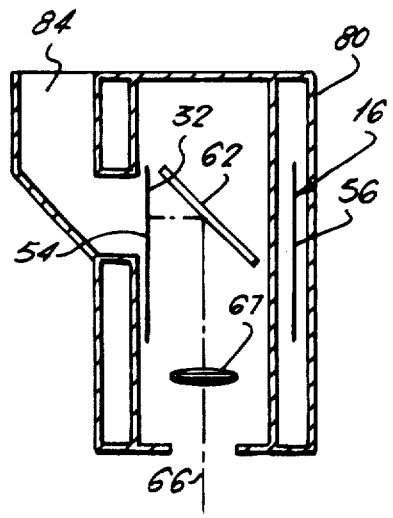

Referring to FIGS. 3A and 3B these show the viewer in more detail. The housing 80 for the viewer supports the lenses 65 and 67 and mirrors 60 and 62. In addition it holds the two arms 54 and 56 of the film. Further a cowl 82 is provided on the underside of the housing through which ambient light is collected and supplied to an area beneath the region of the left-hand image 30 on the film 16 adjacent the edge 34. Similarly a cowl 84 is provided on the top of the housing to supply light to the region of the right-hand image on the film 16 adjacent the edge 36.

Because of necessity two images are recorded on a piece of film, those images have to be about half the width and height of the single image which would be recorded on the equivalent film in a conventional non-stereoscopic camera. Therefore, there is a problem with the quality of the resulting stereoscopic images when they are enlarged for viewing or projection, particularly if the film is of a small format, e.g. 8 mm.

Figure 5:
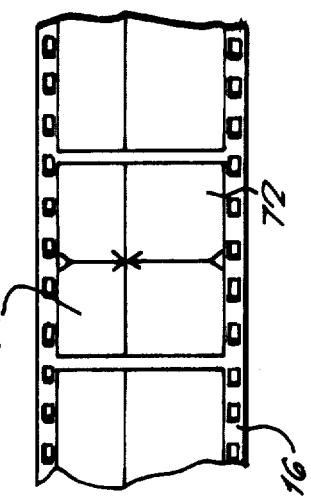
FIG. 5 is a diagram showing the relationship on a piece of film of a left-hand and a right-hand image of a stereoscopic pair when exposed according to a further feature of the present invention.

To assist in overcoming this, it will be seen that as best shown in FIG. 5, I make one of the images smaller in the widthwise sense of the film 16 than the other whilst keeping the two images of the same size reduction or scale relative the original size. For the sake of illustration, the lower image 72 as seen in FIG. 5 will be assumed to be the right-hand image whilst the upper image 74 will be assumed to be the left-hand image but this is not essential. In addition for illustration in FIG. 5, the left and right-hand images 72 and 74 are shown as being coincident along the length of the film 16 which will not of course be the case as they will normally be spaced along the length of the film in the way shown in FIG. 4.

The widths of the right and left-hand images 72 and 74 are the same, that is the actual width of each image, not the height of the image across the width of film 16. However, the top portion of the left-hand image 74 is missing so that the width across the film, i.e. the height of the actual image of the right-hand image 72, is larger than the height of the left-hand image 74. Therefore, the right-hand image 72 occupies a greater proportion of the width of the film 19 than the left-hand image. By way of example, the right-hand image can occupy 60% of the available width of the film 19 whilst the left-hand image occupies 40%. Also typically for a length of 35 mm film the right-hand image 74 could be 14 mm wide and 13 mm high whilst the left-hand image could be 14 mm wide and 11 mm high.

I find that it usually does not matter that the top portion of the image 74 is missing because frequently much of the scene in that portion of the image is sky and so contains little or no information of a stereoscopic nature. Therefore, when the two images are recombined, the impression of the person viewing the images is of a more or less completely stereoscopic scene since the left and right-hand images duplicate those items in the middle ground and foreground where stereoscopic effect is important but do not duplicate that portion in the distance and the brain of the user seems capable of accepting this and it is not apparent that for the left-hand image, in this example, some of the information at the top of the image is missing.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention herein.

I claim:

1. A method of forming a stereoscopic pair of images on a length of photographic film, comprising the steps of: extending a length of the film into a loop between the positions where the individual images of said stereoscopic pair are to be exposed, said loop comprising a pair of spaced, substantially flat and parallel arms joined by a bent portion where the film turns through 180°; adjusting the spacing of the axes of the pair of images to be formed while moving the bent portion of said film and adjusting the relative lengths of said arms so as to maintain constant spacing between the positions to be exposed on said film as measured along said loop; and exposing one image of said stereoscopic pair adjacent one longitudinal side of said film over approximately half the available width of the film in one of said arms and exposing the other image of said stereoscopic pair adjacent the other longitudinal side of the film in the other of said arms over the remaining available width of the film.

2. A method according to claim 1 in which the said film has an emulsion side and said images are recorded on said emulsion side of the film, and in which the planes of the film in said arms of the loop are at right angles to the plane of the original image being photographed, the light image being turned into the plane of the film by reflectors oriented to reflect the images in opposite directions, one towards said emulsion side of the film on one arm of said loop and the other again towards said emulsion side of the film but on the other arm of said loop.

3. A method as claimed in claim 2 in which, for viewing the resulting stereoscopic pair of images, the planes of the film in the two arms of said loop are parallel to the axis of viewing and reflectors are used to bend the axes of the images so that they appear in the same virtual plane at right angles to the planes of the film in the arms of the loop.

4. A method as claimed in claim 1 in which one image of said pair is larger than the other in the widthwise direction of the film, the larger image containing the full image of a scene whilst the smaller image omits a portion at the top of the image of the scene.

5. A method of forming a stereoscopic pair of images on a length of photographic film in which one image is exposed adjacent one longitudinal side of the film and the other image is exposed adjacent the other longitudinal side of the film over the remaining available width of film, one image of the pair being larger than the other in the widthwise direction of the film, the large image containing the full image of a scene whilst the smaller image omits a portion at the top of the image of the scene.

6. A method as claimed in claim 5 in which said larger image occupies from 55 to 65% of the width of the film and said smaller image occupies from 45 to 35% of the width of the film.

7. A length of film having spaced along it sets of stereoscopic pairs of images, one image of each pair being positioned adjacent one longitudinal edge of the film over a width of approximately half the available width of the film and the other image of the pair being positioned adjacent the other longitudinal edge of the film over the remaining available width of the film, the images of a pair being oriented so that one is upside down relative the other.

8. A length of photographic film according to claim 7 in which one image of the pair is larger than the other in the widthwise direction of the film, the larger image containing the full image of a scene whilst the smaller image omits a portion at the top of the image of the scene.

9. A length of photographic film having spaced along it sets of stereoscopic pairs of images, one image of each pair being positioned adjacent one longitudinal edge of the film and the other image being positioned adjacent the other longitudinal edge of the film, one image of the pair being larger than the other in the widthwise direction of the film, the larger image containing the full image of a scene whilst the smaller image omits a portion at the top of the image of the scene.

10. A camera for exposing a stereoscopic pair of images, said camera comprising: means for holding a length of film in the form of a loop comprising two substantially flat arms and a bent portion spacing and joining said arms where the film is bent through 180°; two optical systems, one for recording a left-hand image and one for recording a right-hand image, said left-hand optical system being arranged to record the left-hand image on one arm of the film adjacent one edge thereof and the right-hand optical system being arranged to record the right-hand image on the other arm adjacent the other edge thereof, means to vary the spacing between the axes of the two optical systems and to move the position of said bent portion of film to maintain the spacing substantially constant between the left-hand and right-hand images on the film as measured along the loop, and means for advancing the film between exposures along one arm, around the bent portion and along the other arm.

11. A camera as claimed in claim 10 in which each optical system includes a reflector angled at 45° to the planes of the film in the arms of the loops, a first reflector being angled to direct an image onto one arm of the loop and a second reflector being angled at 90° to the first reflector to direct an image onto the other arm of the loop.

12. A camera as claimed in claim 10 in which said means to vary the spacing between the optical systems comprises means for moving them equal and opposite amounts relative a central axis half-way between them.

13. A camera as claimed in claim 12 in which said means to vary the spacing between the optical systems additionally retains the film in alignment with the optical system by shortening one arm of the loop of film and lengthening the other.

14. A camera as claimed in claim 10 in which the optical systems are arranged so that one image of the pair is larger than the other in the widthwise direction of the film, the larger image containing the full image of a scene whilst the smaller image omits a portion at the top of the image of the scene.

15. A viewer for viewing a stereoscopic pair of images formed on alternate widthwise portions spaced along a length of photographic film, said viewer comprising: means for holding the film in the form of a loop, said loop being formed by first and second substantially flat and spaced arms, and a 180° bent portion joining said arms; first and second viewing lens systems, the first for viewing the left-hand image and including a first reflector between the two arms angled at 45° to the plane of the film in the first arm for turning the plane of the image 90°, and the second for viewing the right-hand image and including a second reflector between the two arms angled at 45° to the plane of the film in the second arm and at 90° to the first reflector for turning the plane of the image 90°, and means for adjusting the spacing between the axes of said two viewing lens systems and moving the position of said bent portion of film along said loop to maintain the left-hand and right-hand images in line with the respective lenses.

16. A viewer as claimed in claim 15 in which means are provided to vary the spacing between the two viewing lens systems to suit the eye spacing of a user, the spacing being variable by moving the lens systems by equal and opposite amounts relative to a central axis half-way between them, the images on the film being held aligned with the viewing lens systems during the adjustment of the spacing.

* * * * *